(12) United States Patent
Liu

(10) Patent No.: US 8,588,303 B2
(45) Date of Patent: *Nov. 19, 2013

(54) MULTIPLE PREDICTOR SETS FOR INTRA-FRAME CODING

(75) Inventor: Lingzhi Liu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 428 days.

This patent is subject to a terminal disclaimer.

(21) Appl. No.: 13/007,882

(22) Filed: Jan. 17, 2011

(65) Prior Publication Data

US 2011/0243230 A1 Oct. 6, 2011

Related U.S. Application Data

(60) Provisional application No. 61/319,811, filed on Mar. 31, 2010.

(51) Int. Cl.
*H04N 7/32* (2006.01)

(52) U.S. Cl.
USPC ........................................... 375/240.14

(58) Field of Classification Search
USPC ........................................... 375/240
See application file for complete search history.

(56) References Cited

U.S. PATENT DOCUMENTS

| | | | |
|---|---|---|---|
| 7,450,640 B2 * | 11/2008 | Kim et al. | 375/240.12 |
| 2009/0034857 A1 * | 2/2009 | Moriya et al. | 382/238 |
| 2009/0220005 A1 * | 9/2009 | Kim et al. | 375/240.16 |
| 2010/0054616 A1 * | 3/2010 | Kim | 382/238 |
| 2010/0118943 A1 * | 5/2010 | Shiodera et al. | 375/240.12 |

OTHER PUBLICATIONS

Li, Guichun, "Integration of Plane Mode in Unified Intra Prediction," Joint Collaborative Team on Video Coding (JCT-VC) of ITU-T SG16 WP3 and ISO/IEC JTC1/SC29/WG11, Jctvc-C111, Oct. 7-15, 2010, 5 pages.
Ye, Yan, et al., "Improved H.264 Intra Coding Based on Bi-Directional Intra Prediction, Directional Transform, and Adaptive Coefficient Scanning," IEEE International Conference on Image Processing, Oct. 2008, pp. 2,116-2,119.
Tsukuba, Takeshi, et al., "Adaptive Multidirectional Intra Prediction," IU-T Q.6/SG16 VCEG, VCEG-AG05, Oct. 20, 2007, 6 pages.
Yang, Jiheng, et al., "A Block-Matching Based Intra Frame Prediction for H.264/AVC," IEEE ICME, 2006, pp. 705-708.

(Continued)

*Primary Examiner* — Mehrdad Dastouri
*Assistant Examiner* — Nguyen Truong
(74) *Attorney, Agent, or Firm* — Conley Rose, P.C.; Grant Rodolph; Clint Wilkins

(57) ABSTRACT

An apparatus comprising a processor configured to receive a current block of an image, select an optimal prediction mode of a plurality of prediction modes for the current block, wherein the selected prediction mode corresponds to a selected one of a plurality of group-numbers and a selected one of a plurality of index-numbers, predict one of the plurality of group-numbers based on a first known group-number and a second known group-number, wherein the predicted group-number is predicted independent from any known index-numbers, clear a first flag when the predicted group-number matches the selected group-number, and set the first flag and encode the selected group-number into a coded data stream when the predicted group-number does not match the selected group-number, wherein the first flag is located in an overhead of the coded data stream.

17 Claims, 8 Drawing Sheets

(56) References Cited

OTHER PUBLICATIONS

Ye, Yan, et al., "Improved Intra Coding," ITU-T Q.6/SG16 VCEG, VCEG-AG11, Oct. 20, 2007, 6 pages.

Li, Guichun, et al., "Integration of Plane Mode in Unified Intra Prediction," JCTV-C111 Powerpoint, Santa Clara University, Oct. 7-15, 2010, 15 pages.

Liu, Lingzhi, "Multiple Predictor Sets for Intra Coding," JCT-VC of ITU-T SG16 WP3 and ISO/IEC JTC1/SC29/WG11, JCTVC-A022, Apr. 15-23, 2010, 10 pages.

Choi, Byeong-Doo, et al., "Adaptive Coefficient Scanning Based on the Intra Prediction Mode," ETRI Journal, vol. 29, Oct. 2007, pp. 694-696.

Bossen, Frank, "Common Test Conditions and Software Reference Configurations," Joint Collaborative Team on Video Coding (JCT-VC) of ITUT SG16 WP3 and ISO/IEC JTC1/SC29/WG11, JCTVC-B300, Jul. 21-28, 2010, 12 pages.

Min, Jung-Hye, "Unification of the Directional Intra Prediction Methods in TMuC," Joint Collaborative Team on Video Coding (JCT-VC) of ITUT SG16 WP3 and ISO/IEC JTC1/SC29/WG11, JCTVC-B100, Jul. 21-28, 2010, 3 pages.

"Test Model Under Consideration," Joint Collaborative Team on Video Coding (JCT-VC) of ITUT SG16 WP3 and ISO/IEC JTC1/SC29/WG11, JCTVC-B205, Jul. 21-28, 2010, 180 pages.

\* cited by examiner

MULTIPLE PREDICTOR SETS FOR INTRA-FRAME CODING

CROSS-REFERENCE TO RELATED APPLICATIONS

This application claims the benefit of U.S. Provisional Application No. 61/319,811 filed on Mar. 31, 2010 by Lingzhi Liu et al., entitled "Multiple Predictor Sets for Intra-Frame Coding," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, for example when the data is to be streamed or otherwise communicated across a communications network with limited bandwidth capacity. Thus, video data is generally compressed prior to being communicated across modern day telecommunications networks. Video compression devices often use software and/or hardware at the source to encode the video data prior to transmission, thereby decreasing the quantity of data needed to represent digital video images. The compressed data is then received at the destination by a video decompression device that decodes the video data. Improved compression/decompression techniques that increase compression ratios without substantially reducing image quality are desirable due to limited network resources.

SUMMARY

In one embodiment, the disclosure includes an apparatus comprising a processor configured to receive a current block of an image, select an optimal prediction mode of a plurality of prediction modes for the current block, wherein the selected prediction mode corresponds to a selected one of a plurality of group-numbers and a selected one of a plurality of index-numbers, predict one of the plurality of group-numbers based on a first known group-number and a second known group-number, wherein the predicted group-number is predicted independent from any known index-numbers, clear a first flag when the predicted group-number matches the selected group-number, and set the first flag and encode the selected group-number into a coded data stream when the predicted group-number does not match the selected group-number, wherein the first flag is located in an overhead of the coded data stream.

In another embodiment, the disclosure includes an apparatus comprising, a receiver unit configured to receive a coded data stream comprising a first flag, a second flag, and an encoded residual block of an image, a logic circuitry configured to predict one of a plurality of index-numbers based on a first known index-number and a second known index-number, wherein the predicted index-number is predicted independent from any known group-numbers, determine that a selected index-number matches the predicted index-number when the second flag is cleared, and determine that a selected index-number matches an encoded index-number when the second flag is set, wherein the coded data stream further comprises the encoded index-number only when the second flag is set, and wherein there are multiple prediction modes associated with each index number.

In yet another embodiment, the disclosure includes a method comprising predicting a group-number based on one or more known group-numbers, wherein the predicted group-number is predicted independent from any known index-numbers, determining if a selected group-number matches the predicted group-number, predicting an index-number based on one or more known index-numbers, wherein the predicted index-number is predicted independent from any known group-numbers, and determining if a selected index-number matches the predicted index-number.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
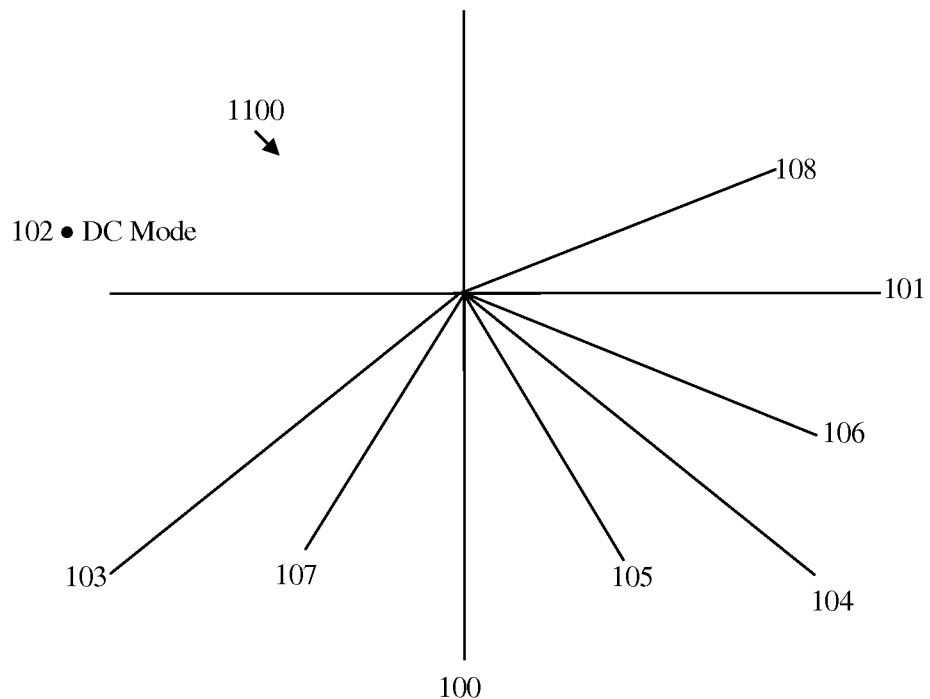
FIGS. 1A and 1B are schematic diagrams of embodiments of a predictor set that may be used during intra prediction.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g. 0, 1, . . . or 255) that represents an image quality or characteristic, such as luminance or chrominance, at the corresponding reference point. Typically, groups of pixels (macroblocks) within a single frame may be substantially correlated with other macroblocks within the same frame such that pixel values across some macroblocks may vary only slightly and/or exhibit repetitious textures. Modern methods of video-compression exploit these spatial correlations using various techniques which may be known collectively as intra-frame prediction (hereinafter, intra prediction). Intra prediction may reduce spatial redundancies between adjacent and/or neighboring macroblocks (hereinafter, blocks) in the same frame, thereby compressing the video data without greatly reducing image quality. Different forms of intra prediction have been described by various conventional video/image coding standards, such as International Telecommunications Union (ITU) Telecommunications Standardization Sector (ITU-T) H.264 (hereinafter, H.264) and International Organization for Standardization (ISO)/International Electrotechnical Commission (IEC) Moving Picture Experts Group (MPEG) 4 Visual, both of which are incorporated herein by reference as if reproduced in their entirety.

In practice, intra predication may be implemented by video coders/decoders (codecs) to interpolate a predicted block from one or more previously coded/decoded neighboring blocks, thereby creating an approximation of the current block. Hence, the encoder and decoder may interpolate the predicted block independently, thereby enabling a substantial portion of a frame and/or image to be reconstructed from the communication of a relatively few number of reference blocks, e.g. blocks positioned in (and extending from) the upper-left hand corner of the frame. However, intra prediction alone does not reproduce an image of sufficient quality for modern video, and consequently an error correction message, e.g. a residual message, may be communicated between the encoder and decoder to correct differences between the predicted block and the current block. For instance, an encoder may subtract the predicted block from the current block to produce a residual block, which then may be transformed, quantized, and scanned before being encoded into the coded data stream. Upon reception of the coded data stream, a decoder may add the reconstructed residual block to the independently generated predicted block to recreate the current block. Although the recreated current block may be an imperfect version of the original current block, e.g. due to the lossy nature of intra coding compression, their differences may be so slight as to be virtually imperceptible to the human eye. Thus, substantial bit savings may be derived without noticeably reducing the quality of the reconstructed image.

The residual block may comprise differences between the predicted block and the current block, and therefore many of the residual block's discrete values, e.g. pixel data, may comprise zero and/or near-zero coefficients, e.g. in areas where the predicted block is identical and/or near-identical to the current block. Furthermore, transformation, quantization, and/or scanning of the residual block may remove many of the zero and/or near-zero coefficients from the data stream, thereby resulting in further compression of the video data. Consequently, coding efficiencies may result from more accurate predictions of the original image. To harness these coding efficiencies, conventional video/image coding standards may improve prediction accuracy by using a plurality of prediction modes during intra prediction, e.g. each of which may generate a unique texture. An encoder may select the prediction mode that generates the most accurate prediction for each current block, and consequently may make more accurate predictions (on average) than other encoders that may use fewer prediction modes. For instance, recent research has shown that conventions using 36 intra prediction modes may more accurately predict complex textures than conventions using fewer prediction modes, such as H.264, which uses only nine intra prediction modes. However, the encoder and decoder must use the same prediction mode when independently generating a predicted block, and thus the encoder, in some instances, may be required to communicate the selected prediction mode in the overhead of the data stream, e.g. when the selected prediction mode does not match the predicted prediction mode. As a result, increasing the number of prediction modes during intra prediction may result in greater amounts of overheard, thereby reducing (or in some cases eliminating) the bit savings achieved from the increased prediction accuracy.

For instance, a codec using a single prediction mode, e.g. a DC prediction mode, may not require any overhead bits to communicate the prediction mode because the prediction mode remains fixed, and is therefore known by the decoder. Alternatively, a codec using nine possible prediction modes (e.g. mode-zero, mode-one, . . . , mode-eight) may require four bits of overhead to directly communicate the selected prediction mode to the encoder. Then again, a codec using 36 possible prediction modes may require six bits of overhead to directly communicate the selected prediction mode to the encoder. Four (or six) bits of overhead per block may constitute a substantial amount of overhead over the course of an entire frame and/or sequence of frames, and may significantly decrease coding efficiency. Hence, in some cases the bit savings that result from increased prediction accuracy may be partially (or completely) offset by the additional overhead required to communicate the additional prediction mode combinations.

To reduce the bit cost associated with increased prediction mode combinations, modern video codecs may attempt to predict the prediction mode of the current block based on the prediction modes of one or more neighboring blocks. For instance, if a neighboring block directly above the predicted block has a vertical prediction mode, the codec may predict that the prediction mode corresponding to the current block may also be vertical. Further, if the selected prediction mode matches the predicted prediction mode, then the codec (e.g. the encoder) may clear a flag. Otherwise, the codec may set the flag. Importantly, the selected prediction mode is only encoded if the prediction is incorrect. Thus, only one bit of overhead, e.g. one flag bit, may be transmitted when the prediction is correct, thereby resulting in an overhead bit savings of two bits, e.g. versus direct communication of the prediction mode. Alternatively, four bits of overhead, e.g. one flag bit and three bits indicating the correct prediction mode, may be transmitted when the prediction is incorrect, thereby resulting in an overhead bit cost of one bit, e.g. versus direct communication of the prediction mode. Consequently, predicting the prediction mode may result in an overhead savings if the prediction is correct and an overhead cost if the prediction is incorrect. Codecs utilizing nine possible prediction modes are frequently, e.g. more often than not, able to correctly predict the selected prediction mode, and thus the single layer prediction method described above tends to be relatively effective in reducing overhead cost.

On the other hand, the overall probability that a codec will correctly predict the selected prediction mode decreases as additional prediction modes are used, and thus coding efficiencies may suffer and/or diminish accordingly. For instance, codecs using 36 prediction mode combinations (e.g. mode-one, mode-two, . . . mode-thirty-six) are, ceteris paribus, less likely to correctly predict the selected prediction mode, e.g. because the ratio of correct answers to incorrect answers decreases proportionally to the number of possible prediction modes. Consequently, a more efficient and/or effective method of predicting the selected prediction modes is needed for codecs using more than nine prediction modes, e.g. codec using 36 prediction modes.

Disclosed herein is a two layer method for predicting the prediction mode during intra prediction image/video encoding. Specifically, a codec may use a plurality of prediction modes, e.g. 36 prediction modes, which may be split into a plurality of mode groups, e.g. four mode groups. Each mode group (e.g. group-zero, group-one, group-two, and group-three) may comprise a directional sub-set, e.g. comprising eight directional prediction modes, and a non-directional sub-set, e.g. comprising one non-directional prediction mode, such that all the mode groups have a similar sub-set structure. Further, each prediction mode in the first mode group (e.g. group-zero) may correspond with a prediction mode in each of the remaining mode groups (e.g. group-one, group-two, group-three, etc.), such that corresponding clusters of corresponding prediction modes are assigned the same index-number (e.g. index-one, index-two, . . . , index-eight). Thus, each prediction mode may correspond to a unique tuple, e.g. a (group-number, index-number) ordered pair. As such, the codec may make a first layer prediction of the current block's predicted group-number based solely on the group-numbers of one or more neighboring blocks, e.g. irrespective of any known index-numbers. Subsequently, the codec may make a second layer prediction of the current block's predicted index-number based solely on the index-numbers of one or more neighboring blocks, e.g. irrespective of any known group-numbers. The outcome of the first layer prediction may have no bearing on the outcome of the second layer prediction (and vice-versa).

Codecs may be positioned throughout the network, and each codec may act as an encoder (e.g. on the transmitter side) as a decoder (e.g. on the receiver side), or both (e.g. when two-way communication is used). In an embodiment, an encoder and decoder may use a two-layer prediction method during intra prediction to decrease overhead. For instance, an encoder may select an optimal prediction mode based on a cost function, e.g. a rate distortion optimization (RDO) algorithm. The selected prediction mode may correspond to a group-number and an index-number, which may be referred to herein as the selected group-number and the selected index-number, respectively. The encoder may first generate a predicted block corresponding to the selected prediction mode, and then a residual block (e.g. by subtracting the predicted block from the current block). After some processing (e.g. transformation, quantization, etc.), the residual block (or some derivation thereof) may be encoded into the data stream. Next, the encoder may predict a predicted group-number in a first-layer prediction, and compare the predicted group-number to the selected group-number. If the selected group-number matches the predicted group-number, then the encoder may clear a first flag, e.g. in the overhead of the coded data stream. Otherwise, the encoder may set the first flag, and encode the selected group-number to encoded_group_number, e.g. encoded_group_number=(group_ number< predicted_group_number) ? group_number: group_number−1 into the overhead of the coded data stream. Subsequently, the encoder may predict a predicted index-number in a second-layer prediction, and compare the predicted index-number to the selected index-number. If the selected index-number matches the predicted index-number, then the encoder may clear a second flag, e.g. in the overhead of the coded data stream. Otherwise, the encoder may set the second flag, and encode the selected index-number to encoded_index_number, e.g. encoded_index_number=(index_ number< predicted_index_number) ? index_number: index_number−1 into the overhead of the coded data stream.

Upon receiving the coded data stream, the decoder may similarly predict the predicted group-number in a first-layer prediction and read the first flag to verify whether it is cleared or set. If the first flag is cleared, the decoder may determine that the selected group-number matches the predicted group-number. Otherwise (e.g. if the first flag is set), the decoder may determine that the selected group-number does not match the predicted group-number, and subsequently decode the encoded_group_number to group-number, e.g. group_ number=(encoded_group_number< predicted_group_number) ? encoded_group_number: encoded_group_number: group+1, to identify the selected group-number. Next, the decoder may similarly predict the predicted index-number in a second layer prediction and read the second flag to verify whether it is cleared or set. If the second flag is cleared, the decoder may determine that the selected index-number matches the predicted index-number. Otherwise (e.g. if the second flag is set), the decoder may determine that the selected index-number does not match the predicted index-number, and subsequently decode the encoded_index_number to identify the selected index-number, e.g. index_number=(encoded_index_number<predicted_index_number) ? encoded_index_number: encoded_index_number+1. Lastly, the decoder may generate a predicted block according to a selected prediction mode, e.g. corresponding to the (selected group-number, selected index-number) ordered pair, and reconstruct the current block by adding the residual block to the predicted block.

The two-layer approach to intra prediction may produce significant bit savings over the conventional one-layer approach used in H.264, by decreasing the average bits used to communicate the selected prediction mode. For instance, the single-layer approach may require a codec using 36 possible prediction modes to encode either one bit (e.g. a flag bit) when correctly predicting the selected prediction mode or seven bits (e.g. one flag bit and six bits indicating the selected one of 36 possible prediction modes) when incorrectly predicting the selected prediction mode. Alternatively, a two-layer approach may result in four potential outcomes for a codec using 36 prediction modes. When correctly predicting both the group-number and the index-number of the selected prediction mode, the codec may only encode two bits (e.g. two flag bits). When incorrectly predicting the group-number and correctly predicting index-number, the codec may encode four bits (e.g. two flag bits, and two bits indicating the selected one of four possible group-numbers). When correctly predicting the group-number but incorrectly predicting the index-number, the codec may encode five bits (e.g. two flag bits and three bits indicating the selected one of nine possible index-numbers). When incorrectly predicting the group-number and correctly predicting the index-number, the codec may encode seven bits (e.g. two flag bits, two bits indicating the selected one of four possible group-numbers, and three bits indicating the selected one of nine possible index-numbers).

Based on the above bit analysis, the two-layer approach may be slightly less efficient than the one-layer approach when correctly predicting both the group-number and index-number (compared to a correct prediction by the one-layer approach) because two bits (rather than just one bit) must be encoded. The two-layer approach is equally as efficient as the one-layer approach when incorrectly predicting both the group-number and index-number (compared to an incorrect prediction by the one-layer approach) because each approach must encode seven bits. However, the two-layer approach is substantially more efficient than the one layer prediction when either the group-number or the index-number is correctly predicted (compared to an incorrect prediction by the one-layer approach) because either four or five bits (rather than seven bits) must be encoded. On average, the two-layer approach is more efficient for codecs using more than nine prediction modes, e.g. thirty six prediction modes, because the frequency of correct predictions (when compared to incorrect predictions) of the one-layer approach decreases rapidly upon exceeding nine prediction modes. Hence, the two-layer approach may result in an overall bit savings in comparison to the conventional one-layer approach over the course of a standard frame sequence, e.g. as indicated by the experimental data below.

FIG. 1A illustrates a mode group 1100, which may be similar to the predictor set used in H.264. The term "predictor set" may be used interchangeably with the term "mode group" throughout this disclosure. Specifically, the basic mode group 1100 may comprise a directional sub-set of prediction modes and a non-directional sub-set of prediction modes. The directional sub-set of prediction modes may comprise a plurality of directional prediction modes, e.g. eight directional prediction modes, including a vertical prediction mode 100, a horizontal prediction mode 101, a diagonal-down-left prediction mode 103, a diagonal-down-right prediction mode 104, a vertical-right prediction mode 105, a horizontal-down prediction mode 106, a vertical-left prediction mode 107, a horizontal-up prediction mode 108, or combinations thereof. Each directional prediction mode may be used by a codec during intra prediction to interpolate a distinct predicted block, e.g. a predicted block comprising a unique texture. For instance, the vertical prediction mode 100 may generate a predicted block comprising uniform columns, e.g. that are linearly interpolated from adjacent pixels located directly above each respective column, while the horizontal prediction mode 101 may generate a predicted block comprising uniform rows, e.g. that are linearly interpolated from the adjacent pixels located directly to the left of each respective row. The non-directional sub-set may comprise one non-directional prediction mode, such as a DC prediction mode 102. The DC prediction mode 102 may be interpolated from the average of adjacent pixel values from the surrounding neighboring blocks, e.g. the eight adjacent pixels located directly above and/or left of the predicted block. Alternatively, the non-directional sub-set may comprise other well known non-directional prediction modes, such as a template matching mode, a plane prediction mode, a planar mode, a bi-linear prediction mode, etc.

Figure 1B:
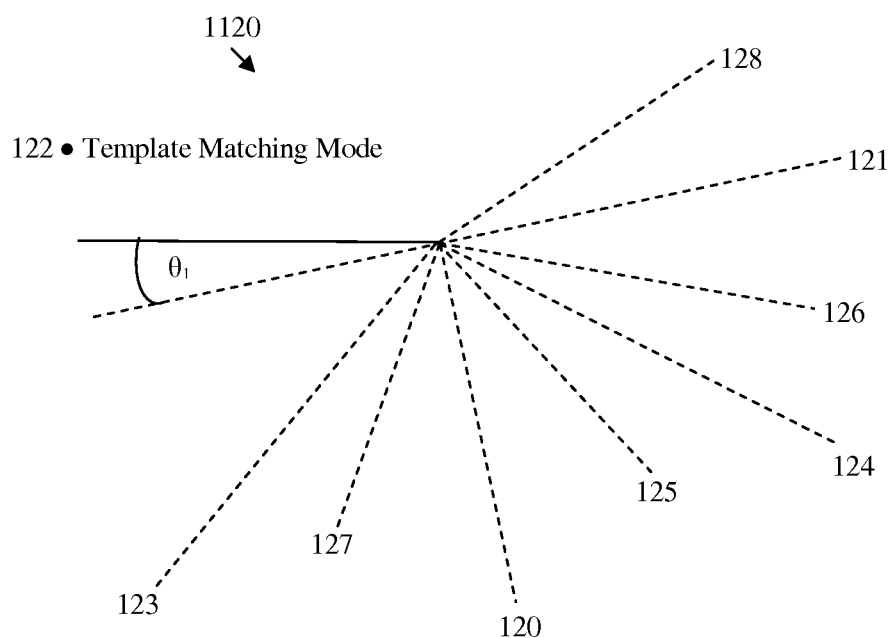

FIG. 1B illustrates an embodiment of a non-basic mode group 1120, which may be used alone or in conjunction with other mode groups, e.g. the basic mode group 1100, during intra prediction coding. Specifically, the non-basic mode group 1120 may comprise a similar sub-set structure to the basic mode group 1100. For instance, the non-basic mode group 1120 may comprise a directional sub-set and a non-directional sub-set. The non-basic mode group's 1120 directional sub-set may correspond to the basic mode group's 1100 directional sub-set. Specifically, the non-basic mode group's 1120 direction sub-set may comprise eight rotated-directional prediction modes each of which comprising a corresponding one of the directional prediction modes, e.g. in the basic mode group 1100, that has been rotated counterclockwise by an angle θ, although clockwise rotation would also be acceptable. The angle θ may be variable, arbitrary, or fixed and may comprise any angle from about 0° to about 179°, e.g. about 5.625°, about 11.25°, about 12.5°, about 16.875°, etc. As such, the non-basic mode group's 1120 rotated-directional prediction modes may include a rotated vertical prediction mode 120, a rotated horizontal prediction mode 121, a rotated diagonal-down-left prediction mode 123, a rotated diagonal-down-right prediction mode 124, a rotated vertical-right prediction mode 125, a rotated horizontal-down prediction mode 126, a rotated vertical-left prediction mode 127, a rotated horizontal-up prediction mode 128, or combinations thereof. In some embodiments, the non-basic mode group's 1120 non-directional sub-set may utilize any one of a variety of well known non-directional interpolation techniques, e.g. a template matching mode, a plane mode, a planar mode, a bi-linear mode, etc. For instance, the non-basic mode group's 1120 non-directional sub-set may implement template matching, which may comprise searching for the nine adjacent pixels of a 4×4 block, or seventeen adjacent pixels of an 8×8 block, in a search area surrounding the predicted block, e.g. an "L" shaped 48×32 block of previously coded/decoded pixels located to the left and/or above the predicted block.

Figure 2:
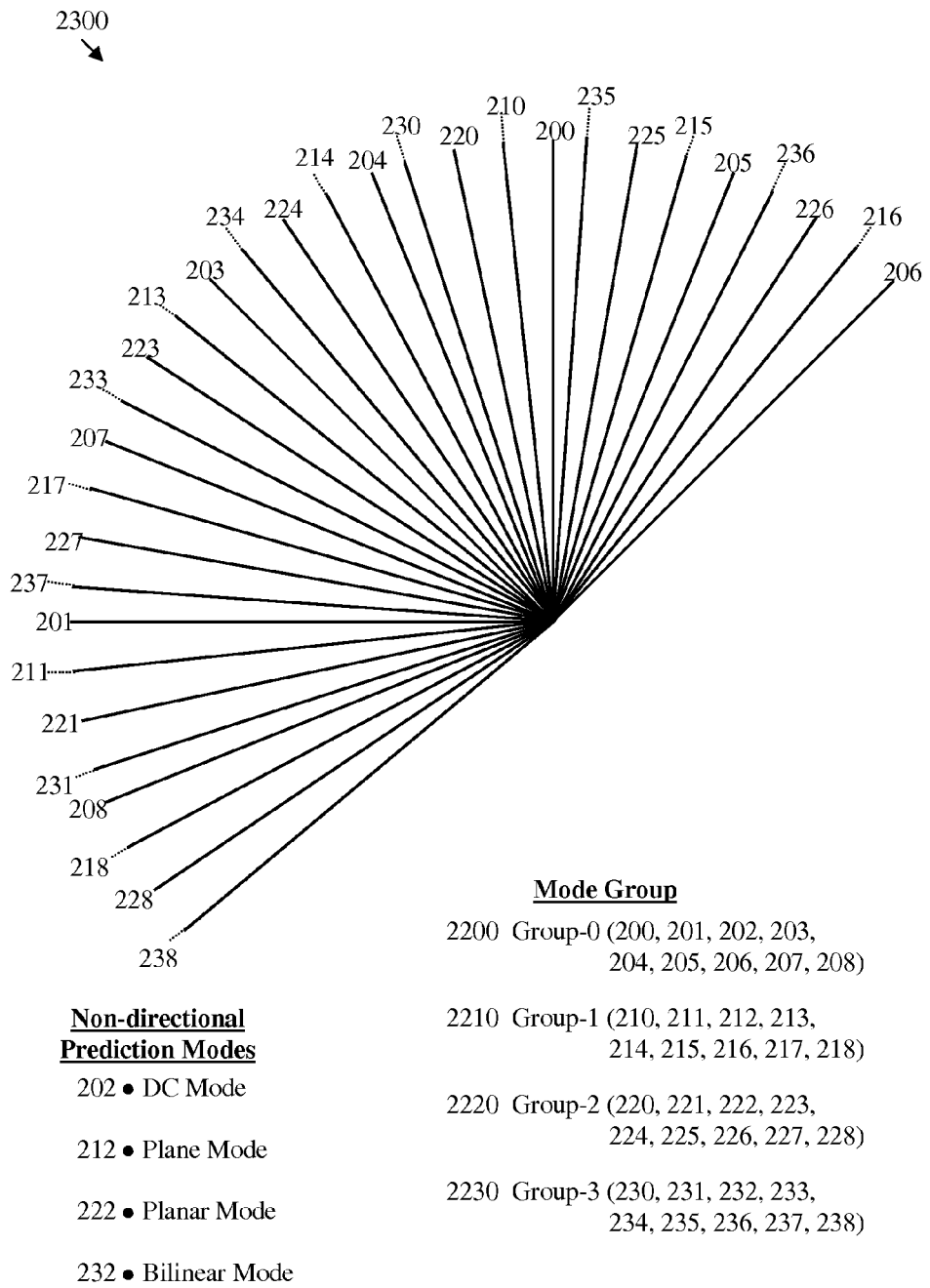
FIG. 2 is a schematic diagram of another embodiment of the predictor set that may be used during intra prediction.

FIG. 2 illustrates an embodiment comprising a multi-mode group 2300 that may be used in intra prediction. The multi-mode group 2300 may comprise a four mode groups, including group-zero 2200, group-one 2210, group-two 2220, and group-three 2230. Group-zero 2200 may be configured similar to the basic mode group 1100 in FIG. 1A, and may comprise a plurality of prediction modes, including a vertical prediction mode 200, a horizontal prediction mode 201, a DC prediction mode 202, a diagonal-down-left prediction mode 203, a diagonal-down-right prediction mode 204, a vertical-right prediction mode 205, a horizontal-down prediction mode 206, a vertical-left prediction mode 207, a horizontal-up prediction mode 208, or combinations thereof. For purposes of clarity/brevity, each of prediction modes 200-208 may be abbreviated hereinafter, e.g. mode 200, mode 201, etc.

Each of group-one 2210, group-two 2220, and group-three 2230 may be configured similar to the non-basic mode group 1120 in FIG. 1A. For instance, each of the groups 2210-2220 may comprise a plurality of rotated-directional prediction modes, e.g. rotated counterclockwise by angle $θ_1$, $θ_2$, and $θ_3$ (respectively), including a rotated vertical prediction mode 210/220/230, a rotated horizontal prediction mode 211/221/231, a rotated diagonal-down-left prediction mode 213/223/233, a rotated diagonal-down-right prediction mode 214/224/234, a rotated vertical-right prediction mode 215/225/235, a rotated horizontal-down prediction mode 216/226/236, a rotated vertical-left prediction mode 217/227/237, a rotated horizontal-up prediction mode 218/228/238, or combinations thereof. Additionally, each of group-one 2210, group-two 2220, and group-three 2230 may comprise any one of a variety of known non-directional prediction modes, such as a plane mode 212, a planar mode 222, and a bilinear mode 232. For purposes of clarity/brevity, each of prediction modes 210-218, 220-228, and 230-238 may be abbreviated hereinafter, e.g. mode 210, mode 211, etc.

Due to their similar sub-set structures, each of prediction modes in group-zero 2200 may correspond to a prediction mode in each of group-one 2210, group-two 2220, and group-three 2230, thereby forming clusters of prediction modes. For instance, the vertical prediction mode 200 may correspond to each of the rotated vertical prediction modes 210/220/230, the horizontal prediction mode 201 may correspond to each of the rotated horizontal prediction modes 211/221/231, etc. Each cluster of prediction modes may be associated with an index-number, e.g. index-zero, index-one, . . . , index-eight, based on quantitative intra mode number statistics, e.g. the statistical probability that one of the prediction modes in a cluster will be selected for a given block (in a standard sequence) irrespective of the selected group-number. For instance, the prediction mode cluster comprising modes 200/210/220/230 may be associated with index-zero, the prediction mode cluster comprising modes 201/211/221/231 may be associated with index-one, the prediction mode cluster comprising modes 202/212/222/232 may be associated with index-two, the prediction mode cluster comprising modes 203/213/223/233 may be associated with index-three, the prediction mode cluster comprising modes 204/214/224/234 may be associated with index-four, the prediction mode cluster comprising modes 205/215/225/235 may be associated with index-five, the prediction mode cluster comprising modes 206/216/226/236 may be associated with index-six, the prediction mode cluster comprising modes 207/217/227/237 may be associated with index-seven, and the prediction mode cluster comprising modes 208/218/228/238 may be associated with index-eight. In some embodiments, a lower index-number may correspond to a higher probability while a higher index-number may correspond to a lower probability. In some embodiments, the index-number may be used during the second-layer prediction, e.g. where the predicted index-number may be determined by the minimum index-number of one or more of the neighboring blocks.

Figure 3A:
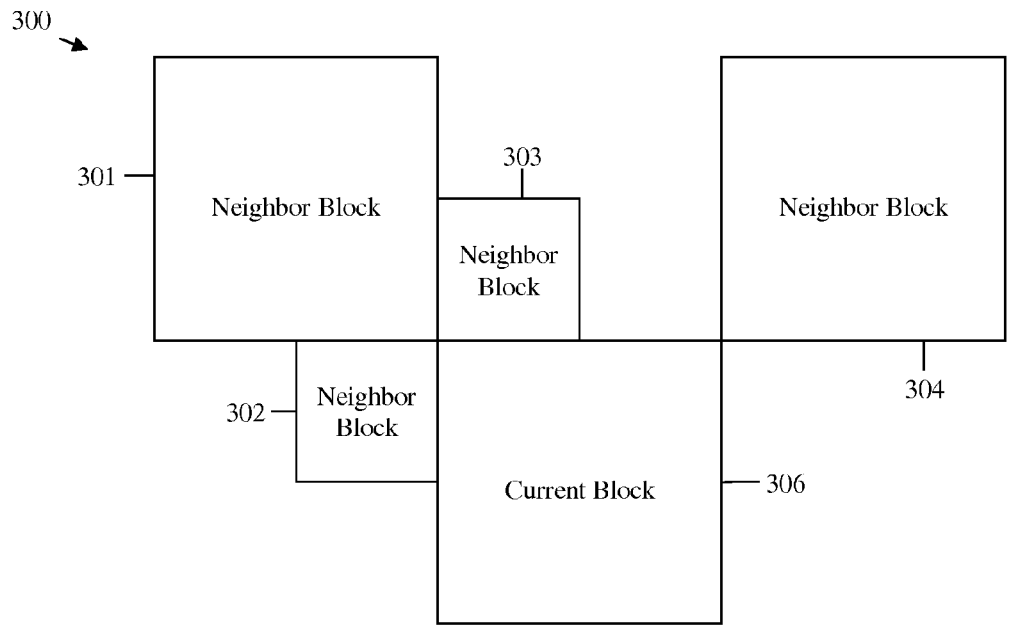
FIGS. 3A and 3B are schematic diagrams of an embodiment of a group of blocks in a frame that may be processed using intra prediction encoding.

FIG. 3A illustrates an embodiment of a group of blocks 300 which may be used during intra prediction. The group of blocks 300 may comprise a plurality of neighbor blocks 301-304 and a current block 306. The plurality of neighbor blocks 301-304 may be previously coded/decoded blocks located to the left and/or above the current block 306. The current block 306 may correspond to an uncompressed block, e.g. on the encoder side. Alternatively, the current block 306 may correspond to a not yet decoded block, e.g. on the decoder side. The neighbor blocks 301-304 and/or the current block 306 may comprise various sizes and/or orientations, e.g. 4×4, 8×8, 16×16, 16×8, or any other array of pixels. Further, the inherent size and/or orientation of the blocks in FIG. 3, e.g. in respect to one another, is for illustrative purposes only. For instance, the inherent size and/or orientation of the neighboring blocks 301-304 and/or current block 306 may vary independently from one another.

In an embodiment, a codec may interpolate the pixel values of a predicted block, e.g. corresponding to the current block 306, from the adjacent pixel values of neighboring blocks 301-304 and/or other neighboring blocks that are not explicitly depicted in FIG. 3. The codec may also predict a group-number and/or index-number, e.g. that corresponds with the current block 306, based on the group-number and/or index-number of one or more of the neighboring blocks 301-304 using two-layer intra prediction. For instance, the codec may make a first-layer prediction of the group-number based on the group-numbers corresponding to the known prediction modes of neighbor block 302 and neighbor block 303, e.g. the lesser of the two group-numbers. Subsequently, the codec may make a second-layer prediction of the index-number based on the index-number corresponding to the known prediction modes of neighbor block 302 and neighbor block 303, e.g. the lesser of the two index-numbers. For example, if neighbor block 302 comprises a prediction mode corresponding to (group-one, index-two) and neighbor block 303 comprises a prediction mode corresponding to (group-zero, index-six), then a two-layer prediction may generate a prediction mode corresponding to (group-zero, index-two).

Figure 3B:
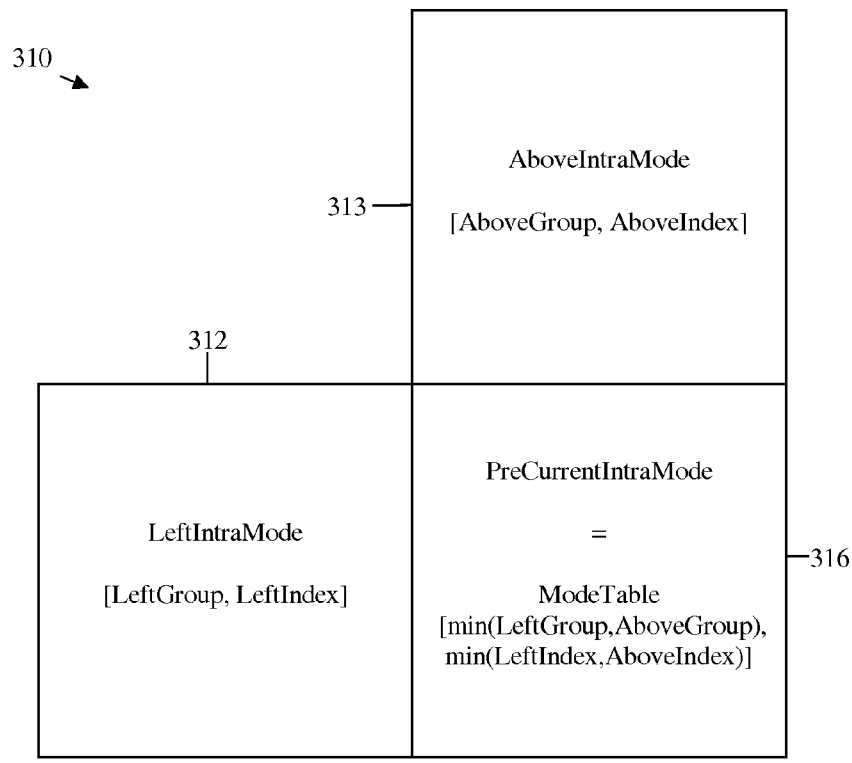

FIG. 3B illustrates an embodiment of a group of blocks 310 which may be used during intra prediction. The group of blocks 310 may comprise a LeftIntraMode Block 312, an AboveIntraMode block 313, and a PredCurrentIntraMode block 316. The LeftIntraMode Block 312 may comprise a prediction mode corresponding to an [LeftGroup, LeftIndex] ordered pair such that LeftGroup may correspond to LeftIntraMode Block's 312 group-number and LeftIndex may correspond to LeftIntraMode Block's 312 index-number. AboveIntraMode block 313 may comprise a prediction mode corresponding to an [AboveGroup, AboveIndex] ordered pair such that AboveGroup may correspond to AboveIntraMode block's 313 group-number and AboveIndex may correspond to AboveIntraMode block's 313 index-number. PredCurrentIntraMode block 316 may be configured similar to the current block 306 of FIG. 3A, and may comprise a prediction mode corresponding to [min(LeftGroup, AboveGroup), min(LeftIndex, AboveIndex)] such that min(LeftGroup, AboveGroup) corresponds to PredCurrentIntraMode's block's 316 group-number and min(LeftIndex, AboveIndex) corresponds to PredCurrentIntraMode block 316's index-number. The code, e.g. Test Model under Consideration (TMuC) 0.7 program code, used to predict PredCurrentIntraMode's block's 316 group-number and index-number may be computed as follows:

PredCurrentMode=[min(LeftGroup,AboveGroup),min (LeftIndex,AboveIndex)]

Figure 4:
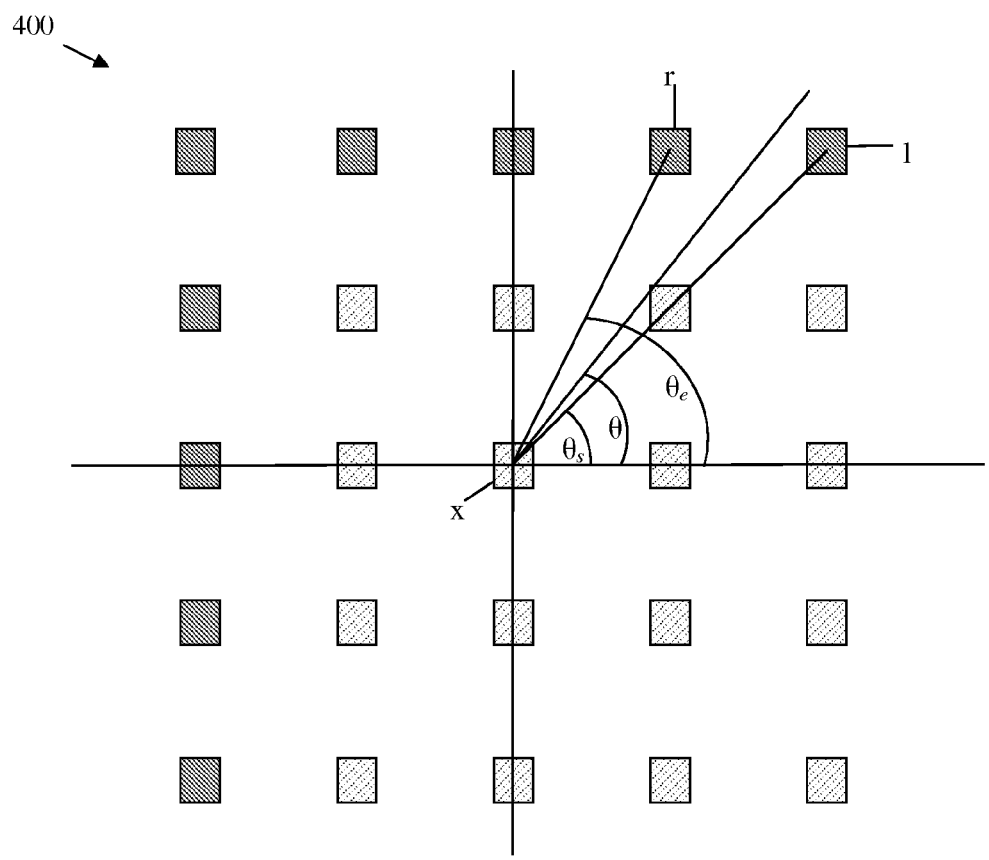
FIG. 4 is a schematic diagram of a block of pixels that illustrates how to calculate pixel values during intra prediction.

When using angled prediction modes, a formula for each reference pixel of the corresponding mode group may be computed depending on the angle of the prediction mode and the values of one or more context pixels. FIG. 4 depicts a group of pixels 400 that may be used to illustrate how the value of a reference pixel (pixel-x) can be calculated according to a pixel line at angle θ and one or more context pixels (pixel-r and pixel-l). A pixel line may be drawn from the center of the reference pixel (e.g. pixel-x) at the angle θ, such that it passes between two context pixels (e.g. pixel-r and pixel-l). Further, a first context line may be drawn from the center of the reference pixel (e.g. pixel-x) to the center of the first context pixels (e.g. pixel-r) at an angle $\theta_e$, and a second context line may be drawn from the center of the reference pixel (e.g. pixel-x) to the center of the second context pixel (e.g. pixel-l) at an angle $\theta_s$. Thus, the probability that an adjacent point is upper-right and vertical can be calculated by:

$$w_{u-r} = \frac{\cot(\pi/4) - \cot(\arctan(2))}{\cot(\pi/4) - \cot(\pi/2)} = 1/2$$

$$w_v = 1 - w_{u-r} = 1/2$$

Hence, the probability that the pixel line at angle θ reaches pixel-x via pixel-l (e.g. $w_l$) or pixel-r (e.g. $w_r$) is:

$$\begin{cases} w_l = \frac{\cot(\theta_s) - \cot(\theta)}{\cot(\theta_s) - \cot(\theta_e)} = 1/2 \\ w_r = 1 - w_l \end{cases}$$

If luminance values on the same pixel-line are constant, then the value of pixel-x (e.g. $p_x$) can be predicted from the value of pixel-l (e.g. $p_l$) and the value of pixel-r (e.g. $p_r$) according to:

$$p_x = w_l \times p_l + w_r \times p_r$$

Figure 5:
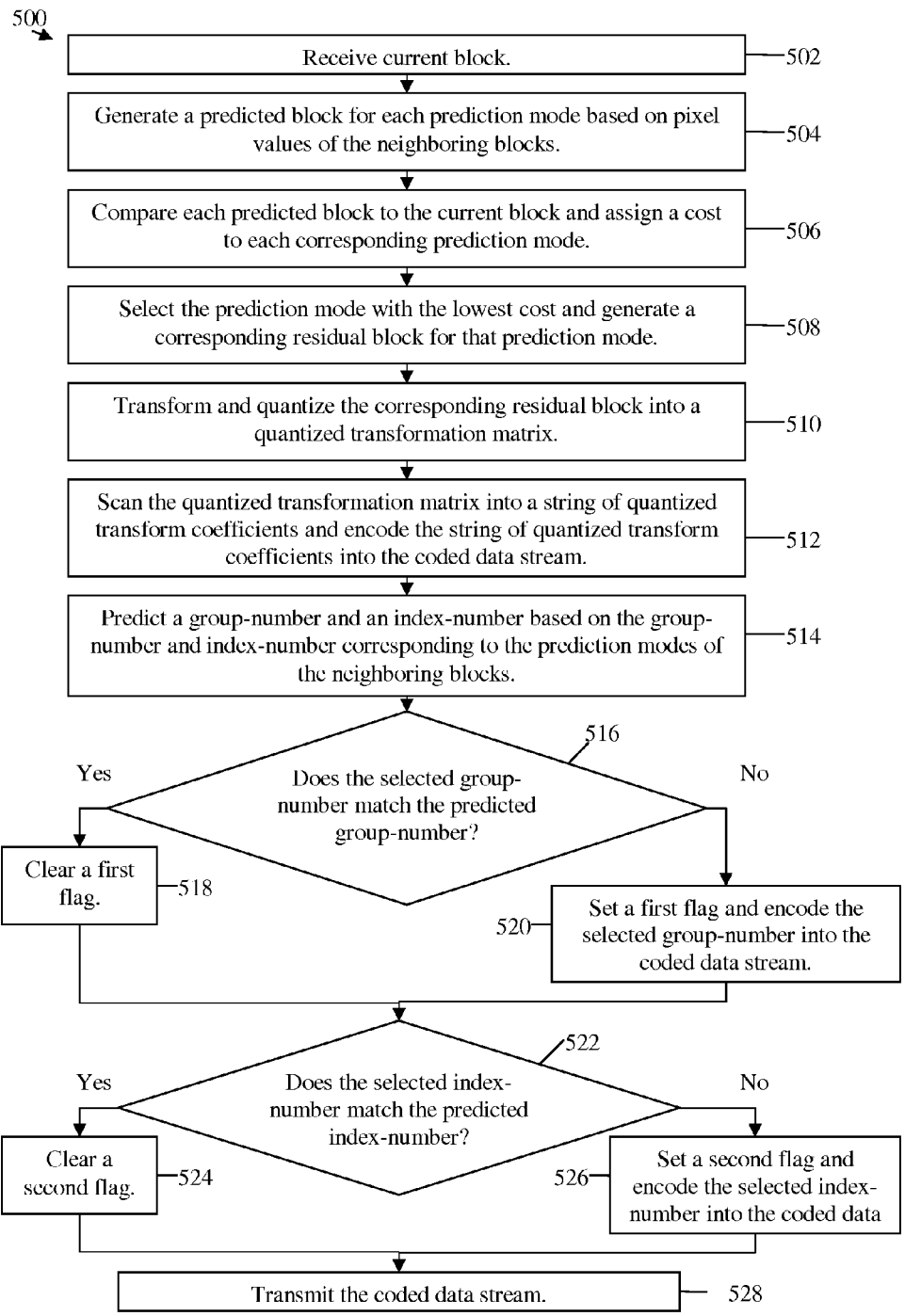
FIG. 5 is a flowchart of an embodiment of a method for encoding a current block using two-layer intra prediction.

Some or all of these equations may be used to calculate new pixel formulas for the non-basic prediction modes according to the pixels from the already coded neighboring blocks. For example, prediction mode corresponding with [group-1, index-7] may be computed below:

cur_pred[0][0]=(imgpel)((3*P_A+P_B+2)>>2);

cur_pred[0][1]=(imgpel)((3*P_B+P_C+2)>>2);

cur_pred[2][0]=(imgpel)((P_A+3*P_B+2)>>2);

cur_pred[0][2]=(imgpel)((3*P_C+P_D+2)>>2);

cur_pred[2][1]=(imgpel)((P_B+3*P_C+2)>>2);

cur_pred[0][3]=(imgpel)((3*P_D+P_E+2)>>2);

cur_pred[2][2]=(imgpel)((P_C+3*P_D+2)>>2);

cur_pred[2][3]=(imgpel)((P_D+3*P_E+2)>>2);

cur_pred[1][0]=(imgpel)((P_A+P_B+1)>>1);

cur_pred[1][1]=(imgpel)((P_B+P_C+1)>>1);

cur_pred[3][0]=(imgpel)((P_A+2*P_B+P_C+2)>>2);

cur_pred[1][2]=(imgpel)((P_C+P_D+1)>>1);

cur_pred[3][1]=(imgpel)((P_B+2*P_C+P_D+2)>>2);

cur_pred[1][3]=(imgpel)((P_D+P_E+1)>>1);

cur_pred[3][2]=(imgpel)((P_C+2*P_D+P_E+2)>>2);

cur_pred[3][3]=(imgpel)((P_D+2*P_E+P_F+2)>>2);

FIG. 5 illustrates an embodiment of a two-layer intra prediction encoding method 400, which may be used by a codec to compress video data, e.g. on an encoder side. At step 502, the codec may receive a current block, e.g. a block of raw pixel values corresponding to an uncompressed image or frame. At step 504, the codec may generate a predicted block for each of a plurality of prediction modes based on the adjacent pixel values of one or more neighboring block. In some embodiments, each of the plurality of prediction modes may correspond to a unique (group-number, index-number) ordered pair. At step 506, the codec may compare each predicted block to the current block, and assign a cost to each corresponding prediction mode. Assigning a cost to each corresponding prediction mode may comprise applying a cost function, e.g. a RDO algorithm, to determine an error rate for the predicted block. The cost may be indicative of a projected bit cost for the corresponding prediction mode, and hence may be analogous to the projected compressibility of a resulting residual block. For instance, a residual block may be generated for each prediction mode, and a statistical estimator, e.g. a means squared error function, may be applied to the residual block to determine the average error of the predicted block. At step 508, the codec may select the prediction mode with the lowest associated cost and generate a corresponding residual block, e.g. if the corresponding residual block was not generated during the RDO algorithm at step 506. At step 510, the codec may transform and quantize the corresponding residual block into a quantized transformation matrix, thereby compressing the residual block. Specifically, the transformation may comprise transforming the residual signal from the spatial domain to the frequency domain (e.g. using an integer transform or discrete cosign transform), which may transform the residual block (e.g. comprising a plurality of differential pixel values) into a transformation matrix (e.g. comprising a plurality of transform coefficients). In some embodiments, each of the transform coefficients may represent a different spatial frequency, with some of the spatial frequencies comprising varying degrees of significance to human visual perception. Quantization may comprise attenuating some of the less significant transform coefficients and thereafter rounding each transform coefficient to a discrete integer value. In some embodiments, one or more of the transform coefficients may be attenuated to near-zero values, and accordingly may be rounded to zero during quantization. As such, the quantized transformation matrix may comprise a significant number of zero coefficients. At step 512, the codec may scan the quantized transformation matrix into a string of quantized transform coefficients, and thereafter encode the string of quantized transform coefficients into the coded data stream. The process of scanning and encoding may reduce the number of zero coefficients in the coded data stream, thereby further compressing the image.

At step 514, the codec may predict a group-number and/or index-number based on the group-number and/or index-number corresponding to the prediction mode of one or more neighboring blocks. For instance, the predicted group-number may equal the minor group-number, e.g. smallest group-number, corresponding to the prediction modes of the neighboring blocks located directly above and to the left of the current block. Additionally, the predicted index-number may equal the minor index-number of the index-numbers corresponding to the prediction modes of the neighboring blocks located directly above and to the left of the current block. Specifically, the group-number may be determined irrespective of any known index-numbers (and vice versa). At step 516, the codec may determine whether the predicted group-number matches the selected group-number. If so, the codec may clear a first flag at step 518. Otherwise, the codec may set the first flag, and subsequently encode the selected group-number in the data stream at step 520. In some embodiments, the flag may be about one bit, e.g. located in the overhead of the coded data stream that has a value of either zero or one, e.g. indicating a cleared status or a set status (respectively). At step 522, the codec may determine whether the predicted index-number matches the selected index-number. If so, the codec may clear a second flag at step 524. Otherwise, the codec may set the second flag and encode the selected index-number into the coded data stream at step 526. At step 528, the codec may transmit the coded data stream over a medium, e.g. in a communications network.

Figure 6:
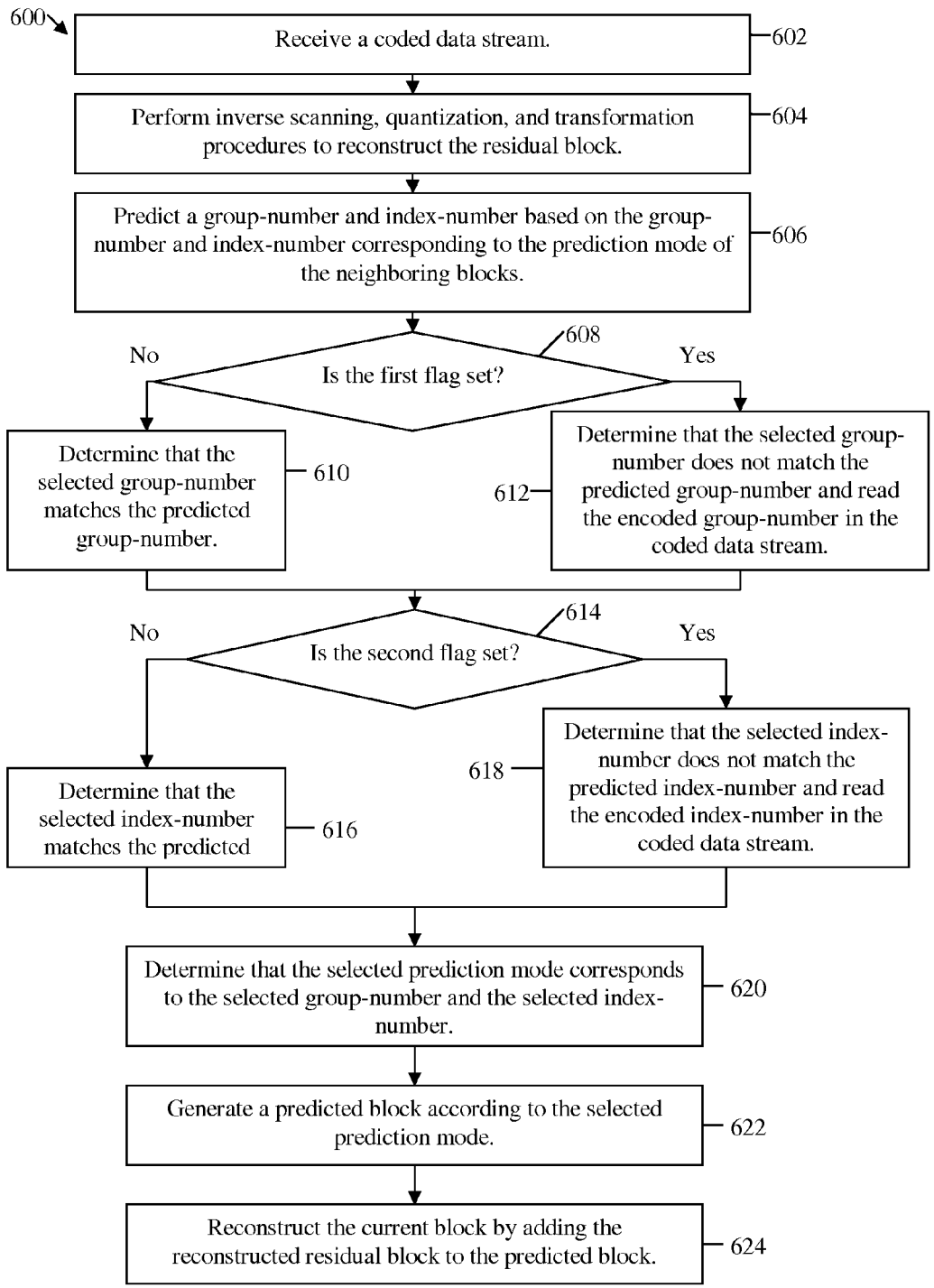
FIG. 6 is a flowchart of an embodiment of a method for decoding a current block using two-layer intra prediction.

FIG. 6 illustrates an embodiment of a two-layer intra prediction decoding method 600, which may be used by a codec to de-compress encoded video data, e.g. on the decoder side. At step 602, the codec may receive the coded data stream comprising compressed video data, e.g. information that may be used to reconstruct the current block, including a string of quantized transform coefficients, a first flag, a second flag, and potentially an encoded group-number and/or encoded index-number. At step 604, the codec may perform inverse scanning, quantization, and transformation procedures to reconstruct the residual block from the string of quantized transform coefficients. The reconstructed residual block may be a close approximation of the residual block generated during encoding, e.g. the residual block generated at step 508 of the two-layer intra prediction encoding method 500. At step 606, the decoder may predict a group-number and/or index-number based on the group-number and/or index-number corresponding to the prediction mode of one or more neighboring blocks, e.g. previously decoded blocks located to the left and/or right of the soon to be reconstructed current block. In some embodiments, the prediction made in step 606 may be substantially similar (in many respects) to the prediction made in step 514 of the two-layer intra prediction encoding method 500, in that the predicted group-number may be predicted irrespective of any known index-numbers (and vice versa). At step 608, the decoder may read the first flag to verify whether the first flag is set or cleared. If the first flag is cleared, then the decoder may determine that the selected group-number matches the predicted group-number at step 610. Alternatively, if the first flag is set, the encoder may determine that the selected group-number does not match the predicted group-number, and read the encoded group-number from the coded data stream at step 612. At step 614, the encoder may read the second flag to verify whether the second flag is set or cleared. If the second flag is cleared, then the decoder may determine that the selected index-number matches the predicted index-number at step 616. Alternatively, if the second flag is set, the decoder may determine that the selected index-number does not match the predicted index-number, and read the selected index-number from the coded data stream at step 618. At step 620, the decoder may determine that the selected prediction mode corresponds to the selected group-number and the selected index-number. At step 622, the decoder may generate a predicted block that corresponds to the selected prediction mode. At step 624, the decoder may reconstruct the current block by adding the reconstructed residual block to the predicted block.

Ultimately, the two-layer technique described herein may be compatible with key technical areas (KTA) software, and the coding gain achieved may be enhanced when implemented with other KTA tools, such as Adaptive loop filter, among others. Additionally, using mode groups comprising similar sub-set structures may reduce the computational complexity on the encoder and/or decoder side by utilizing, in some situations, relatively simple arithmetic computations, such as additions and right shifts similar to H.264. Example coding implementations may include introducing a mode_group_flag (or, alternatively, a predictor_set_flag) to indicate the predicted mode group. In some embodiments, the syntax in the bit stream may be as follows:

```
If (transform_8X8_mode) flag && mb_type == 1_NxN)
{
transform_size_8X8_flag
predictor_set_flag
}
```

In some embodiments, a uniform intra-prediction (UIP) operation may be performed by the codec, e.g. on the encoder side, and may comprise two rounds of R-D cost searching for each partition unit (PU). The first round may comprise using a Hadamard transform to obtain an optimal rotated-directional prediction mode, e.g. the prediction mode with the lowest sum of absolute differences (SAD) value, out of the 24 rotated-directional prediction modes in the non-basic prediction groups, e.g. group-one, group-two, and group-three. In an embodiment, the optimal rotated-directional prediction mode may be determined using a fast mode selection algorithm, e.g. a Fast_Mode_Selection 25 [9,33], and thus may not comprise a full R-D calculation. In the second round, the optimal rotated-directional prediction mode (e.g. as determined in round one) may be compared to the remaining prediction modes, e.g. the nine prediction modes of the basic-group (e.g. group-zero) and the non-directional prediction modes of the non-basic groups, using a full R-D calculation. In an embodiment, this may be determined using a standard R-D mode selection algorithm, e.g. a R-D_Mode_Selection 9[0,8]+2/3/4. In some embodiments, the number of non-directional prediction modes may vary according to the PU size, e.g. a 4×4 PU may comprise one additional non-directional prediction mode (such as a plane mode). In some embodiments, the prediction modes within the same index number may be calculated as well, e.g. as if the best directional prediction mode does not belong to either, depending on the different bit-lengths for the syntax (e.g. 8×8, 16×16, 32×32, etc.).

EXAMPLE

The following test results show a comparison between the one-layer and two-layer approaches to intra prediction. The average Bjøntegaard delta (BD)-Rate Gain (i.e. coding gain) on Class B, C, D, E is 0.6 percent on High Efficiency Intra Prediction Only testing, and 0.7 percent on Low Complexity Intra Only testing (testing on Class A was not completed), as shown in Table 1. The result shows that with the proposed method, the coding gain is better on sequences with higher resolution, because more large prediction unites can be selected, and more directions are available for intra predictions. On 1080p sequences, the proposed method produces average coding gain for about 0.6 percent-0.7 percent; on 720p sequences, 0.8 percent-0.9 percent of coding gain is achieved.

TABLE 1

Coding Gain of Intra Only Mode

| | Intra High Efficiency | | | Intra Low Complexity | | |
|---|---|---|---|---|---|---|
| | Y BD-rate | U BD-rate | V BD-rate | Y BD-rate | U BD-rate | V BD-rate |
| Class B | −0.7% | −0.6% | −0.7% | −0.6% | −0.4% | −0.4% |
| Class C | −0.4% | −0.5% | −0.5% | −0.6% | −0.4% | −0.4% |
| Class D | −0.3% | −0.4% | −0.4% | −0.5% | −0.3% | −0.3% |
| Class E | −0.8% | −0.7% | −0.7% | −0.9% | −0.6% | −0.6% |
| All | −0.6% | −0.5% | −0.6% | −0.7% | −0.4% | −0.4% |

Figure 7:
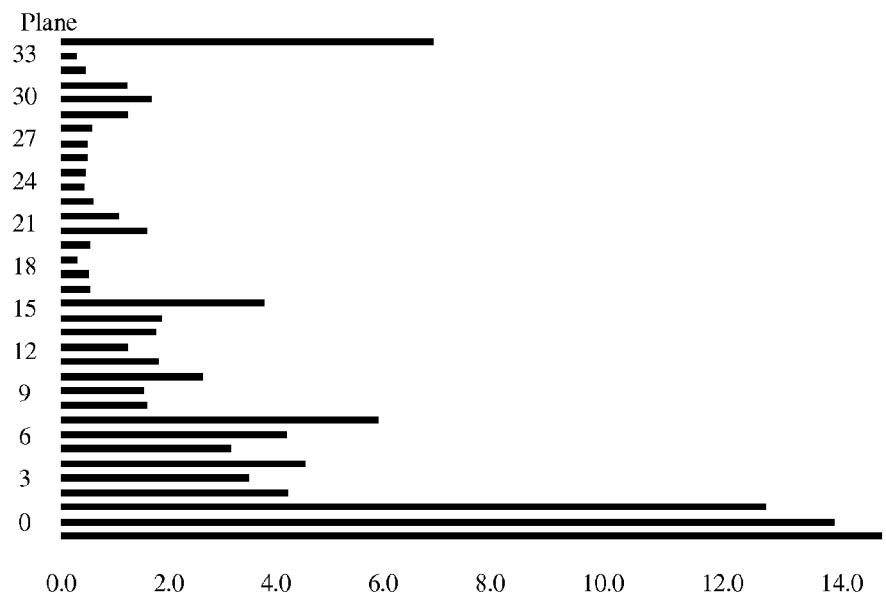
FIG. 7 is a chart of average percentages of each Intra Predictor amount in all coded Intra Predictors on 1080p sequences.

Intra Mode Number Statistics: During the testing, the data of coded intra prediction mode numbers are collected. Table 2 shows the average percentage of each Intra Predictor amount in all coded Intra Predictors on 1080p sequences, and the chart is shown in FIG. 7. The integrated plane mode is used for 6.7 percent in all Intra Modes, which is higher than other modes except prediction modes corresponding to index-0, index-1, and index-2, which means it is necessary to use this predictor in intra prediction.

TABLE 2

Percentage of Each Intra Mode Numbers (1080p Sequences)

| Mode Number | 0 | 1 | 2 | 3 | 4 | 5 | 6 | 7 | 8 | 9 | 10 | 11 |
|---|---|---|---|---|---|---|---|---|---|---|---|---|
| Percentage | 14.6% | 13.8% | 12.6% | 4.1% | 3.4% | 4.3% | 3.0% | 4.0% | 5.7% | 1.6% | 1.5% | 2.5% |
| Mode Number | 12 | 13 | 14 | 15 | 16 | 17 | 18 | 19 | 20 | 21 | 22 | 23 |
| Percentage | 1.7% | 1.2% | 1.7% | 1.8% | 3.6% | 0.5% | 0.5% | 0.3% | 0.5% | 1.5% | 1.1% | 0.6% |

TABLE 2-continued

Percentage of Each Intra Mode Numbers (1080p Sequences)

| Mode Number | 24 | 25 | 26 | 27 | 28 | 29 | 30 | 31 | 32 | 33 | 34 |
|---|---|---|---|---|---|---|---|---|---|---|---|
| Percentage | 0.4% | 0.4% | 0.5% | 0.5% | 0.6% | 1.2% | 1.6% | 1.2% | 0.4% | 0.3% | 6.7% |

According to the experimental results, the coding gains on high resolution sequences are prominent when using the proposed method. In addition, the decoder side computational complexity is not increased, and the modification on the TMuC code is minimized. Further, all the original predictors in Unified Intra Prediction are preserved, and the Arbitrary Directional Intra (ADI) plane mode predictor is utilized for the proposed Intra Plane Mode. In conclusion, the proposed method is a potential part of the Intra Prediction Tool for the next generation video coding standard. It is recommended to integrate plane mode into Unified Intra Prediction in Test Model, and to set up TE to test the efficiency.

Figure 8:
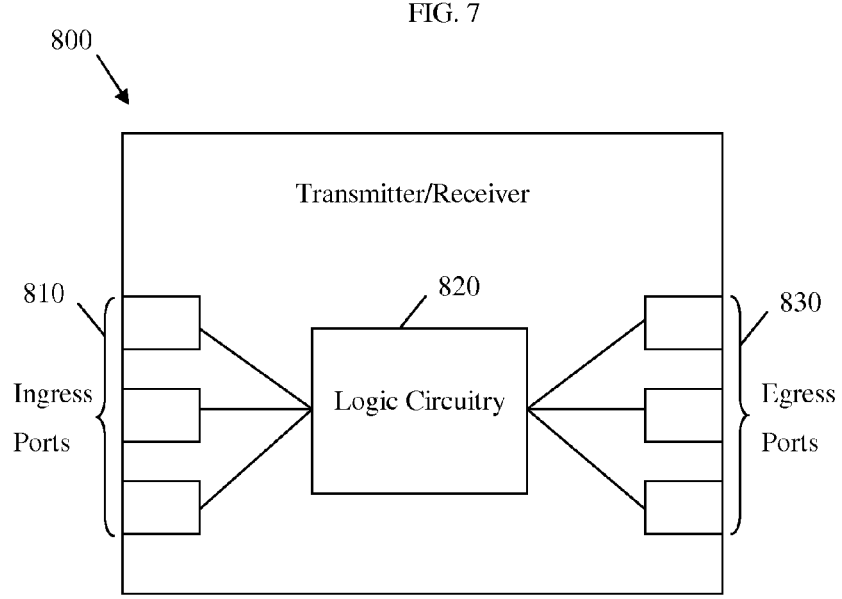
FIG. 8 is a schematic diagram of an embodiment of a transmitter/receiver unit.

FIG. 8 illustrates an embodiment of a transmitter/receiver unit 800, which may be located at, coupled to, or part of any of the codecs described herein or any other component within the network or system. The transmitter/receiver unit 800 may be any device that processes images as described herein. For instance, the transmitter/receiver unit 800 may correspond to or may be located in a media controller at an image transmitter and/or receiver. The transmitted/receiver unit 800 may comprise a plurality of ingress ports or receiver units 810 for receiving data from other codecs, logic circuitry 820 to determine which codecs to send the data to, and a plurality of egress ports or transmitter units 830 for transmitting data to the other codecs.

Figure 9:
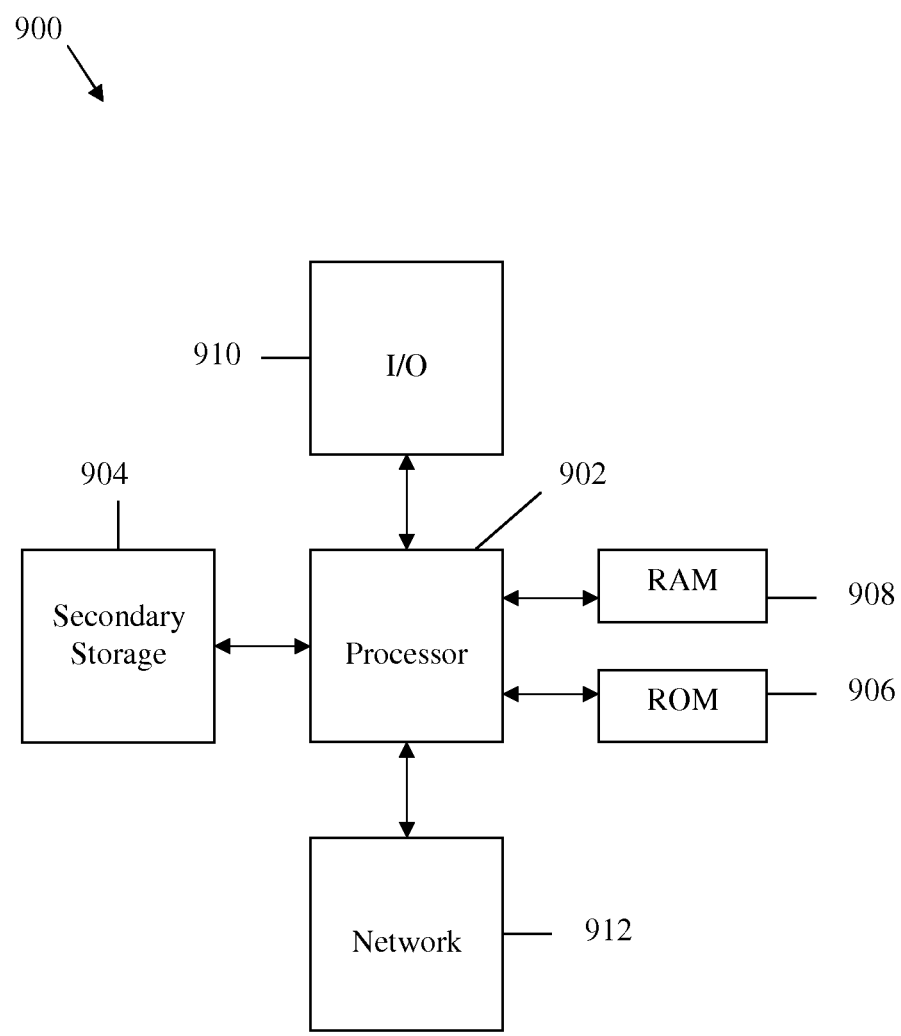
FIG. 9 is a schematic diagram of an embodiment of an exemplary general-purpose computer system.

The network described above may be implemented on any general-purpose network component, such as a computer or network component with sufficient processing power, memory resources, and network throughput capability to handle the necessary workload placed upon it. FIG. 9 illustrates a typical, general-purpose network component suitable for implementing one or more embodiments of a node disclosed herein. The network component 900 includes a processor 902 (which may be referred to as a central processor unit or CPU) that is in communication with memory devices including secondary storage 904, read only memory (ROM) 906, random access memory (RAM) 908, input/output (I/O) 910 devices, and network connectivity devices 912. The processor may be implemented as one or more CPU chips, or may be part of one or more application specific integrated circuits (ASICs) and/or digital signal processors (DSPs).

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage. The RAM 908 is used to store volatile data and perhaps to store instructions. Access to both ROM 906 and RAM 908 is typically faster than to secondary storage 904.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising a processor configured to:
receive a current block of an image;
select an optimal prediction mode of a plurality of prediction modes for the current block, wherein the selected prediction mode corresponds to a selected one of a plurality of group-numbers and a selected one of a plurality of index-numbers;
predict one of the plurality of group-numbers based on a first known group-number and a second known group-number, wherein the predicted group-number is predicted independent from any known index-numbers;
clear a first flag when the predicted group-number matches the selected group-number;
set the first flag and encode the selected group-number into a coded data stream when the predicted group-number does not match the selected group-number,
wherein the first flag is located in an overhead of the coded data stream predict one of the plurality of index-numbers based on a first known index-number and a second known index-number, wherein the predicted index-number is predicted independent from any known group-numbers;
clear a second flag when the predicted index-number matches the selected index-number; and
set the second flag and encode the selected index-number when the predicted group number does not match the selected group-number, wherein the second flag is located in the overhead of the coded data stream.

2. The apparatus of claim 1, wherein each prediction mode corresponds to one of the group-numbers and one of the index-numbers, and wherein no two prediction modes that correspond to the same group-number also correspond to the same index-number.

3. The apparatus of claim 2, wherein the first known group-number and the first known index-number correspond to a first known prediction mode of a first neighboring block located above the current block, wherein the second known group-number and second known index-number correspond to a second known prediction mode of a second neighboring block located to the left of the current block, and wherein the first neighboring block and the second neighboring block are previously encoded blocks.

4. The apparatus of claim 1, wherein the encoded data stream comprises an encoded group-number only when the first flag is set and an encoded index-number only when the second flag is set, wherein the encoded group-number comprises two bits, wherein the encoded index-number comprises three bits, and wherein the first flag and second flag each comprise one bit.

5. The apparatus of claim 1, wherein the processor is further configured to generate a predicted block corresponding to the selected prediction mode by interpolating a plurality of reference pixels from a plurality of context pixels, wherein each reference pixel's value ($p_x$) is based on a first context pixel's value ($p_l$) and a second context pixel's value ($p_r$) according to:

$$p_x = p_l\left(\frac{\cot(\theta_s) - \cot(\theta)}{\cot(\theta_s) - \cot(\theta_e)}\right) + p_r\left(1 - \frac{\cot(\theta_s) - \cot(\theta)}{\cot(\theta_s) - \cot(\theta_e)}\right),$$

where $\theta$ is an angle of a pixel line corresponding to the selected prediction mode, $\theta_s$ is an angle of a pixel line extending from the center of the reference pixel to the center of the first context pixel, and $\theta_e$ is an angle of a pixel line extending from the center of the reference pixel to the center of the second context pixel.

6. The apparatus of claim 1, wherein the plurality of group-numbers consists of a first group-number corresponding to a first prediction mode group, a second group-number corresponding to a second prediction mode group, a third group-number corresponding to a third prediction mode group, and a fourth group-number corresponding to a fourth prediction mode group,
wherein the first prediction mode group comprises a first non-directional prediction mode and a plurality of first directional prediction modes,
wherein the second prediction mode group comprises a second non-directional prediction mode and a plurality of second directional prediction modes each of which corresponding to one of the first directional prediction modes that has been rotated by a first angle,
wherein the third prediction mode group comprises a third non-directional prediction mode and a plurality of third directional prediction modes each of which corresponding to one of the first directional prediction modes that has been rotated by a second angle not equal to the first angle, and
wherein the fourth prediction mode group comprises a fourth non-directional prediction mode and a plurality of fourth directional prediction modes each of which corresponding to one of the first directional prediction modes that has been rotated by a third angle not equal to the first angle or the second angle.

7. The apparatus of claim 6, wherein each of the first directional prediction modes comprise one of the eight directional prediction modes used in International Telecommunications Union (ITU) Telecommunications Standardization Sector (ITU-T) H.264, wherein the second angle is double the first angle, and wherein the third angle is triple the first angle.

8. An apparatus comprising:
a receiver unit configured to receive a coded data stream comprising a first flag, a second flag, and an encoded residual block of an image;
a logic circuitry configured to: predict one of a plurality of index-numbers based on a first known index-number and a second known index-number, wherein the predicted index-number is predicted independent from any known group-numbers; determine that a selected index-number matches the predicted index-number when the second flag is cleared; and determine that a selected index-number matches an encoded index-number when the second flag is set, wherein the coded data stream further comprises the encoded index-number only when the second flag is set, and wherein there are multiple prediction modes associated with each index number wherein the logic circuitry is further configured to:
predict one of a plurality of group-numbers based on a first known group-number and a second known group-number, wherein the predicted group-number is predicted independent from any known index-numbers;
determine that a selected group-number matches the predicted group-number when the first flag is cleared; and
determine that a selected group-number matches an encoded group-number when the first flag is set, wherein the coded data stream further comprises the encoded-group-number only when the first flag is set.

9. The apparatus of claim 8, wherein the first flag and the second flag are set, wherein the encoded group-number comprises two bits, and wherein the encoded index-number comprises three bits.

10. The apparatus of claim 8, wherein the logic circuitry is further configured to:
   determine that a selected one of a plurality of prediction modes corresponds with both the selected group-number and the selected index-number;
   generate a predicted block corresponding to the selected prediction mode; and
   recreate a current block by adding a residual block to the predicted block, wherein the residual block is obtained by appropriately processing an encoded residual block.

11. The apparatus of claim 8, wherein each of the prediction modes correspond to one of the group-numbers and one of the index-numbers, and wherein no two prediction modes corresponding to the same group-number also correspond to the same index-number.

12. The apparatus of claim 8 wherein the first known group-number and the first known index-number correspond to a first known prediction mode of a first neighboring block located above the current block, wherein the second known group-number and second known index-number correspond to a second known prediction mode of a second neighboring block located left of the current block, and wherein the first neighboring block and the second neighboring block are previously decoded blocks.

13. The apparatus of claim 12, wherein the plurality of group-numbers consists of a first group-number corresponding to a first prediction mode group, a second group-number corresponding to a second prediction mode group, a third group-number corresponding to a third prediction mode group, and a fourth group-number corresponding to a fourth prediction mode group,
   wherein the first prediction mode group comprises a first non-directional prediction mode and a plurality of first directional prediction modes,
   wherein the second prediction mode group comprises a second non-directional prediction mode and a plurality of second directional prediction modes each of which corresponding to one of the first directional prediction modes that has been rotated counterclockwise by a first angle,
   wherein the third prediction mode group comprises a third non-directional prediction mode and a plurality of third directional prediction modes each of which corresponding to one of the first directional prediction modes that has been rotated counterclockwise by a second angle not equal to the first angle, and
   wherein the fourth prediction mode group comprises a fourth non-directional prediction mode and a plurality of fourth directional prediction modes each of which corresponding to one of the first directional prediction modes that has been rotated counterclockwise by a third angle not equal to the first angle or the second angle.

14. The apparatus of claim 13, wherein each of the first directional prediction modes comprises one of the eight directional prediction modes used in International Telecommunications Union (ITU) Telecommunications Standardization Sector (ITU-T) H.264, wherein the second angle is about double the first angle, and wherein the third angle is about triple the first angle.

15. A method comprising:
   predicting a group-number based on one or more known group-numbers, wherein the predicted group-number is predicted independent from any known index-numbers;
   determining if a selected group-number matches the predicted group-number;
   predicting an index-number based on one or more known index-numbers, wherein the predicted index-number is predicted independent from any known group-numbers;
   determining if a selected index-number matches the predicted index-number selecting an optimal prediction mode out of a plurality of prediction modes, wherein the selected prediction mode corresponds to the selected group-number and the selected index-number;
   clearing a first flag when the selected group-number matches the predicted group-number;
   setting the first flag and encoding the selected group-number when the selected group-number does not match the predicted group-number;
   clearing a second flag when the selected index-number matches the predicted index-number; and
   setting the second flag and encoding the selected index-number when the selected index-number does not match the predicted index-number.

16. The method of claim 15, wherein determining if the selected group-number matches the predicted group-number comprises reading a first flag to verify whether the first flag is set or cleared, and wherein determining if the selected index-number matches the predicted index-number comprises reading a second flag to verify whether the second flag is set or cleared.

17. The method of claim 16, wherein the first flag is set and the second flag is not set, and wherein the method further comprises:
   determining that the selected group-number is equal to an encoded group-number located in a data stream; and
   determining that a selected prediction mode corresponds with the encoded group-number and the selected index-number, wherein the selected index-number is not located in the data stream.

* * * * *

UNITED STATES PATENT AND TRADEMARK OFFICE
CERTIFICATE OF CORRECTION

PATENT NO. : 8,588,303 B2
APPLICATION NO. : 13/007882
DATED : November 19, 2013
INVENTOR(S) : Lingzhi Liu It is certified that error appears in the above-identified patent and that said Letters Patent is hereby corrected as shown below:

In the Claims:

Column 17, Lines 5-32, printed claim 1 should read as:
1. An apparatus comprising a processor configured to:
    receive a current block of an image;
    select an optimal prediction mode of a plurality of prediction modes for the current block, wherein the selected prediction mode corresponds to a selected one of a plurality of group-numbers and a selected one of a plurality of index-numbers;
    predict one of the plurality of group-numbers based on a first known group-number and a second known group-number, wherein the predicted group-number is predicted independent from any known index-numbers;
    clear a first flag when the predicted group-number matches the selected group-number;
    set the first flag and encode the selected group-number into a coded data stream when the predicted group-number does not match the selected group-number, wherein the first flag is located in an overhead of the coded data stream;
    predict one of the plurality of index-numbers based on a first known index-number and a second known index-number, wherein the predicted index-number is predicted independent from any known group-numbers;
    clear a second flag when the predicted index-number matches the selected index-number; and
    set the second flag and encode the selected index-number when the predicted group-number does not match the selected group-number, wherein the second flag is located in the overhead of the coded data stream.

Column 18, Lines 40-67, printed claim 8 should read as:
8. An apparatus comprising:
    a receiver unit configured to receive a coded data stream comprising a first flag, a second flag, and an encoded residual block of an image;
    a logic circuitry configured to:

Signed and Sealed this
Twenty-ninth Day of April, 2014

Michelle K. Lee
*Deputy Director of the United States Patent and Trademark Office* predict one of a plurality of index-numbers based on a first known index-number and a second known index-number, wherein the predicted index-number is predicted independent from any known group-numbers;

determine that a selected index-number matches the predicted index-number when the second flag is cleared; and determine that a selected index-number matches an encoded index-number when the second flag is set, wherein the coded data stream further comprises the encoded index-number only when the second flag is set, and wherein there are multiple prediction modes associated with each index number wherein the logic circuitry is further configured to:

predict one of a plurality of group-numbers based on a first known group-number and a second known group-number, wherein the predicted group-number is predicted independent from any known index-numbers;

determine that a selected group-number matches the predicted group-number when the first flag is cleared; and determine that a selected group-number matches an encoded group-number when the first flag is set, wherein the coded data stream further comprises the encoded group-number only when the first flag is set.

Column 20, Lines 12-35, printed claim 15 should read as:
15. A method comprising:

predicting a group-number based on one or more known group-numbers, wherein the predicted group-number is predicted independent from any known index-numbers;

determining if a selected group-number matches the predicted group-number;

predicting an index-number based on one or more known index-numbers, wherein the predicted index-number is predicted independent from any known group-numbers;

determining if a selected index-number matches the predicted index-number;

selecting an optimal prediction mode out of a plurality of prediction modes, wherein the selected prediction mode corresponds to the selected group-number and the selected index-number;

clearing a first flag when the selected group-number matches the predicted group-number;

setting the first flag and encoding the selected group-number when the selected group-number does not match the predicted group-number;

clearing a second flag when the selected index-number matches the predicted index-number; and setting the second flag and encoding the selected index-number when the selected index-number does not match the predicted index-number.